United States Patent [19]

Heidenreich

[11] Patent Number: 5,295,909
[45] Date of Patent: Mar. 22, 1994

[54] COMPACT TORQUE LIMITING CLUTCH
[75] Inventor: David C. Heidenreich, Akron, Ohio
[73] Assignee: Power Transmission Technology, Inc., Sharon Center, Ohio
[21] Appl. No.: 877,148
[22] Filed: May 1, 1992

Related U.S. Application Data

[63] Continuation-in-part of Ser. No. 732,096, Jul. 18, 1991, Pat. No. 5,135,088.
[51] Int. Cl.$^5$ .................................................. F16D 7/02
[52] U.S. Cl. .................................... 464/48; 192/30 W; 192/113 AF
[58] Field of Search .......... 464/48; 192/56 R, 85 AA, 192/114 R, 113 AF, 30 W

[56]  References Cited

U.S. PATENT DOCUMENTS

| | | | |
|---|---|---|---|
| 1,505,480 | 8/1924 | Manville | 464/48 |
| 3,984,999 | 10/1976 | Kopp | 192/56 R X |
| 4,401,426 | 8/1983 | Heidenreich | 464/48 X |
| 4,464,137 | 8/1984 | Jennings | 464/48 |
| 4,645,472 | 2/1987 | Heidenreich | 464/48 |
| 4,661,083 | 4/1987 | Heidenreich | 464/48 X |
| 4,907,683 | 3/1990 | Patel | 192/85 AA |
| 5,002,517 | 3/1991 | Heidenreich et al. | 464/48 |
| 5,135,088 | 8/1992 | Heidenreich et al. | 192/56 R |

FOREIGN PATENT DOCUMENTS

| | | | |
|---|---|---|---|
| 696160 | 12/1930 | France | 464/48 |
| 274568 | 6/1970 | U.S.S.R. | 464/48 |
| 376017 | 7/1932 | United Kingdom | 464/48 |
| 574589 | 1/1946 | United Kingdom | 464/48 |
| 2056589 | 3/1981 | United Kingdom | 192/56 R |

Primary Examiner—Rodney H. Bonck
Attorney, Agent, or Firm—Renner, Kenner, Grevie, Bobak, Taylor & Weber

[57]  ABSTRACT

A compact torque limiting clutch provides spring cup bolt assemblies for interengaging a pressure plate and input flange on opposite sides of a friction flange of an output hub. The spring cup assemblies include bolts employed for securing the clutch elements together, such bolts being restricted from rotating during the assembly process by engagement with noncircular apertures passing through the retainer plate. The torque limiting clutch is of a pancake design, contained between axially displaced planar surfaces defined by an input flange on one side and a pressure plate on the other. In another embodiment of the invention, a keeper plate is coaxially secured to an output hub, with a friction disc fixedly secured therebetween. An input drive flange is rotatably mounted on the keeper plate. A separator disc extends the full diameter of the clutch assembly and has cup-shaped shields extending therefrom, serving as seals and heat dissipating members. Torque pins pass through a pressure plate which is urged toward the input hub by a plurality of spring cup bolt assemblies, the torque pins serving as indicators of clutch wear.

18 Claims, 2 Drawing Sheets

COMPACT TORQUE LIMITING CLUTCH

RELATED CASES

This is a continuation-in-part of U.S. patent application Ser. No. 732,096, filed Jul. 18, 1991, now U.S. Pat. No. 5,135,088.

TECHNICAL FIELD

The invention herein resides in the art of torque limiting clutches of the friction type. More particularly, the invention relates to a compact torque limiting clutch adapted to interconnect input and output power sources through a friction media having a characteristic break-away torque.

BACKGROUND ART

The use of torque limiting clutches to couple drive and driven members is well known. In industries requiring such torque limiting clutches, it is well known that the same are designed or selected for specific applications. Each torque limiting clutch typically has a characteristic break-away torque. By employing a torque limiting clutch with a break-away torque which is lower than that at which damage can be done to the drive or driven members, the torque limiting clutch serves to protect the system in which it is employed.

Previously, it has been known to use spring bolts, spring pins and/or spring cups in torque limiting clutches as a force generating means. Such spring bolt assemblies are shown in U.S. Pat. No. 4,401,426, such spring pin assemblies are shown in U.S. Pat. No. 4,645,472, and the spring cup assemblies of a similar nature are shown in U.S. Pat. No. 4,661,083. It is now readily appreciated by those skilled in the art that such spring bolt assemblies, spring pin assemblies, and spring cup assemblies provide for ease of assembly of torque limiting clutches. They further significantly preclude tampering with the torque setting of the clutch, and provide substantially consistent characteristic breakaway torque over the useful life of the clutch.

Despite the compact nature of the spring cups, spring pins, and spring bolts, torque limiting clutches are necessarily of substantial physical size, particularly length. This size results from the necessary inclusion of input and output coupling members, a pressure plate, spring or other force members, and the requisite number of friction elements. The physical size constraints placed on many systems otherwise requiring torque protection often preclude the implementation of torque limiting clutches therein.

It is well known in the art that the size of many torque limiting clutches is often dictated by the assembly techniques employed in their manufacturer, such assembly requiring access areas to nuts, bolts, and the like during the assembly process. When such nuts and bolts are interior to the torque limiting clutch, access openings and clearances must be provided within the clutch to accommodate the assembly process. These areas and openings necessarily aggravate the size considerations given in the design of such torque limiters.

It is further known that the size of a torque limiting clutch is greatly impacted by the nature of the input and output hubs employed for the coupling of drive and driven members thereto. In many known torque limiting clutches, the axial size of the clutch, measured axially from one extreme to the other, has been found to be excessive.

Prior torque limiting clutches have generally failed to provide adequate heat dissipation in a compact unit, and have generally been ineffective in shielding the interior of the clutch from the environment. Such shielding is required to prevent contamination of the friction surfaces, and thereby provides for more accurate torque characteristics.

Additionally, the known prior art has generally not provided for the use of wear indicators to advise the operator when the friction material has been spent.

There is a need in the art for a compact torque limiting clutch of minimal axial dimensions and in which its assembly is easily achieved without the need of access to the internal structure of the assembly. There is a further need for such a torque limiting clutch which achieves effective heat dissipation and protection from the environment while assuring coaxial alignment of the input and output members. There is also the need for such a torque limiting clutch that employs a torque pin as a wear indicator.

DISCLOSURE OF INVENTION

In light of the foregoing, it is a first aspect of the invention to provide a torque limiting clutch which may be assembled and disassembled without internal access to the clutch.

Another aspect of the invention is the provision of a torque limiting clutch which is compact in design.

Yet another aspect of the invention is the provision of a torque limiting clutch which is substantially flat, contained axially between pairs of parallel planar surfaces.

An additional aspect of the invention is the provision of a torque limiting clutch wherein the input and output hubs are nested within each other.

Yet another aspect of the invention is the provision of a torque limiting clutch which is reliable and durable in construction and operation, while being conducive to implementation with state of the art apparatus and techniques.

Still another aspect of the invention is the provision of a torque limiting clutch in which the interior is protected from the environment by the implementation of shields or covers extending from a separator plate to the input flange and pressure plate.

A further aspect of the invention is the provision of a torque limiting clutch in which the heat dissipation is facilitated by the extension of a separator plate to the full diameter of the clutch and by the provision of heat dissipating shields extending therefrom.

Still a further aspect of the invention is the provision of a torque limiting clutch in which a friction member is locked to the output hub and is coaxially aligned therewith, and which rotatably receives the input hub thereon and acts as a bearing mating surface.

Yet another aspect of the invention is the provision of a torque limiting clutch in which a torque pin may be implemented as a means for monitoring clutch wear.

The foregoing and other aspects of the invention which will become apparent as the detailed description proceeds are achieved by a torque limiting clutch, comprising: an input flange; an output hub in forceful frictional engagement with said input flange; a pressure plate; and force generating means operatively interposed between said pressure plate and input flange for urging said output hub into said forceful frictional engagement with said input flange.

Additional aspects of the invention are attained by a torque limiting clutch, comprising: an input flange; an output hub; a pressure plate; a spring and bolt assembly interengaging said input flange, output hub, and pressure plate in forceful frictional engagement; and means of engaging said bolt of said spring bolt assembly for preventing rotational movement of said bolt.

Still further aspects of the invention are attained by a torque limiting clutch, comprising: an input flange; an output hub; a pressure plate received upon said output hub; a first friction disc interposed between said pressure plate and said input flange; and an extension on said first friction disc for receiving said input flange in axial alignment therewith upon a bearing interposed therebetween, bolts securing said first friction disc to said output hub.

DESCRIPTION OF DRAWINGS

For a complete understanding of the objects, techniques and structure of the invention reference should be made to the following detailed description and accompanying drawing wherein.

BEST MODE FOR CARRYING OUT THE INVENTION

Figure 1:
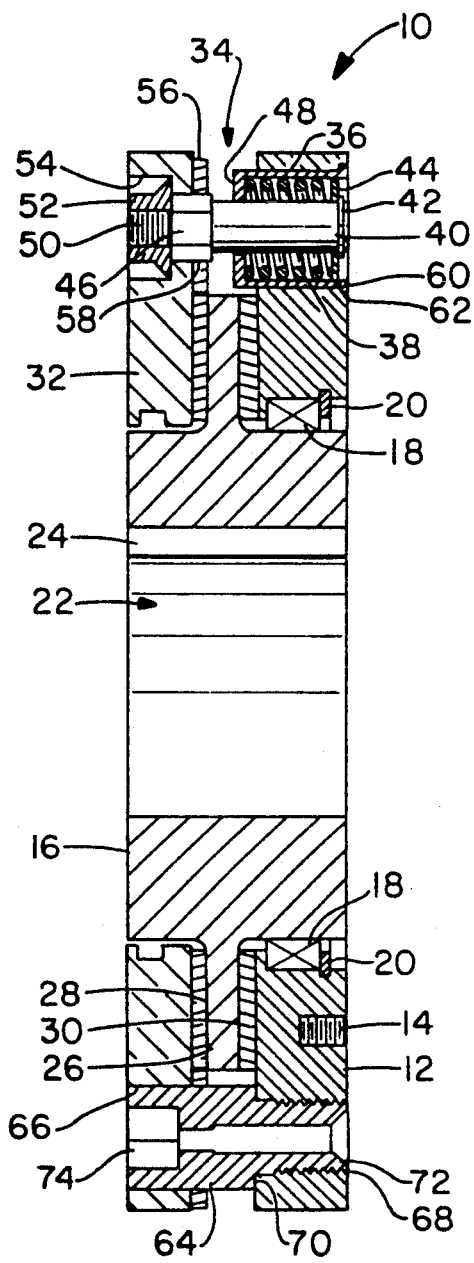
FIG. 1 is a cross sectional view of a compact torque limiting clutch according to a first embodiment of the invention.

Referring now to the drawings and more particularly FIG. 1, it can be seen that a torque limiting clutch according to a first embodiment of the invention is designated generally by the numeral 10. The clutch 10 employs an input flange or ring 12 having a plurality of threaded bores 14 uniformly and radially spaced thereabout to receive a coupler or other appropriate input power source such as a pulley or sprocket. The input flange 12 is received upon an output hub with a bearing 18 interposed therebetween, allowing for relative rotational movement between the input flange 12 and output hub 16. The bearing 18 is maintained in position by means of a keeper ring 20 received within the opening of the input flange 12.

A bore 22 passes axially through the output hub 16 and is adapted for receiving an appropriate shaft or the like of a driven member. A key way 24 is provided within the output hub 16 and in communication with the bore 22 for purposes of receiving a key or spline of the mating shaft.

A flange or ring 26 extends radially from and circumferentially about the output hub 16 and has friction material affixed to opposite faces 28, 30 thereof. A pressure plate 32 is received upon the output hub 16 on a side of the flange 26 opposite the input flange 12.

Spaced about the periphery of the assembly 10 are a plurality of spring cup bolt assemblies 34 which are interengaged between the input hub 12 and pressure plate 32. As will be appreciated by those skilled in the art, the spring cup bolt assemblies 34 urge the pressure plate 32 and input flange 12 toward each other and forcefully against respective friction surfaces 28, 30 of the friction flange 26 of the output hub 16. As will be appreciated by those skilled in the art, the magnitude of the forceful engagement, considered in light of the nature of the friction material of the faces 28, 30, determines the characteristic break-away torque of the clutch 10.

Each of the spring cup bolt assemblies 34 includes a cup or can 36 receiving and containing a spring 38 therein. A bolt 40 passes through an opening within an end cap 48 of the cup 36. At one end of the bolt 40 a washer 44 is maintained by a retaining ring 42. The washer 44 provides a precompressed moveable closure at an external end of the cup 36, engaging the spring 38 and compressing the same against the cap 48 in a manner understood by those skilled in the art to establish a pretested color verified spring force characteristic of the cup assembly 34. While the bolt 40 is substantially of a cylindrical nature, it will be appreciated that a shoulder 46 is provided thereon abutting the end cap 48 of the cup 36 prior to installation and at wear-out. The bolt 40 further has a threaded head 50 adapted to receive a flange nut 52 within a counter bore 54 of the pressure plate 32 at assembly. A retainer plate 56, provided in the form of a ring in the embodiment of FIG. 1, is positioned adjacent the pressure plate 32, having openings 58 passing therethrough for receiving the shoulder 46 of the bolts 40. The openings 58 are of substantially the same geometry as the cross sectional geometry of the shoulder 46. With this geometry being non-circular, and preferably hexagonal, the shoulder 46 mates with the opening 58, with such opening precluding any rotational movement of the bolt 40. The desirability of this feature will become apparent hereinbelow with respect to the assembly technique of the clutch 10.

The cup 36 is provided with a ring flange 60 which is received within a circumferential groove 62 about the bore of the input flange 12 provided for receiving the cup assembly 34. The recessed groove 62 assures that the spring cup bolt assembly 34 does not extend beyond the axially exterior planar surface of the input flange 12.

Torque pins 64 may be provided in circumferentially and radially spaced relationship about the outer edge of the torque limiting clutch 10 as shown. Each torque pin 64 is received within a bore 66 passing through the pressure plate 32 and is threadedly engaged as at 68 into the input flange 12. The shoulder 70 of the torque pin 64 engages and abuts the inner surface of the input flange 12. In the preferred embodiment of the invention, the end 72 of the torque pin 64 is substantially flush with, or recessed with respect to, the axially external surface of the input flange 12. A hex head 74 or other appropriate drive means is provided in one end of the pin 64 for allowing the making of the threaded engagement 68. Those skilled in the art will readily understand that the torque pins 64 are adapted to assure rotational interengagement between the pressure 32 and input hub 12.

In the assembly of the torque limiting clutch 10, it will be appreciated that the input flange 12 and pressure plate 32 are placed over axially opposite ends of the output hub 16, with the bearing 18 properly interposed between the input flange 12 and output hub 16 as retained by the keeper ring 20. A spring cup bolt assembly 34 is then inserted into the appropriate bore or bores spaced about the peripheral outer edge of the input flange 12. At this point, the spring 38 is precompressed an amount determined by the spring extension allowed by the position of the washer 44 when the shoulder 46 abuts the cap 48. The shoulder 46 is passed through the corresponding opening 58 in the retainer plate or ring 56 such that the threaded head 50 is then present within the counterbore 54 of the pressure plate 32. The flange nut 52 is then threaded onto the threaded head 50 of the bolt 40 until it bottoms against the bottom of the bore 54 and the top edge of the shoulder 46. This tightening process draws the pressure plate 32, input flange 12, and friction flange 26, 28, 30 into forceful engagement with each other and provides for additional compression of the spring 38 within the can 36. While the nut 52 is being tightened, the bolt 40 is restrained from any rotational movement by virtue of the mating engagement of the shoulder 46 with the corresponding opening 58 of the retaining plate 56. The spring 38 is further compressed between the cap 48 and washer 44 as the nut 52 is tightened. The tightening draws the shoulder 46 from the cap 48 a distance equal to the wear thickness of the wear surfaces of the clutch 10. As the clutch wears, the cap 48 will move toward the shoulder 46 and will abut each other when the clutch is fully worn.

It will be appreciated that the number and color-designated force of the spring cup bolt assemblies 34 which are employed will determine the characteristic break-away torque of the torque limiting clutch 10. Additionally, it will be appreciated that the clutch assembly 10 is of a "pancake" design, with all of the operative structure thereof being contained between the exterior planar surfaces defined by the input flange 12 and the pressure plate 32. In the preferred embodiment shown, the total maximum axial dimension of the torque limiting clutch 10 is equivalent to the axial dimension of the output hub 16.

It will, of course, be appreciated that so long as the torque applied to the clutch 10 is below the characteristic break-away torque, the output hub 16 will rotate directly with the input flange 12. When that torque is exceeded, the pressure plate 32 and input flange 12 will rotate upon the output hub 16 and relative thereto.

Figure 2:
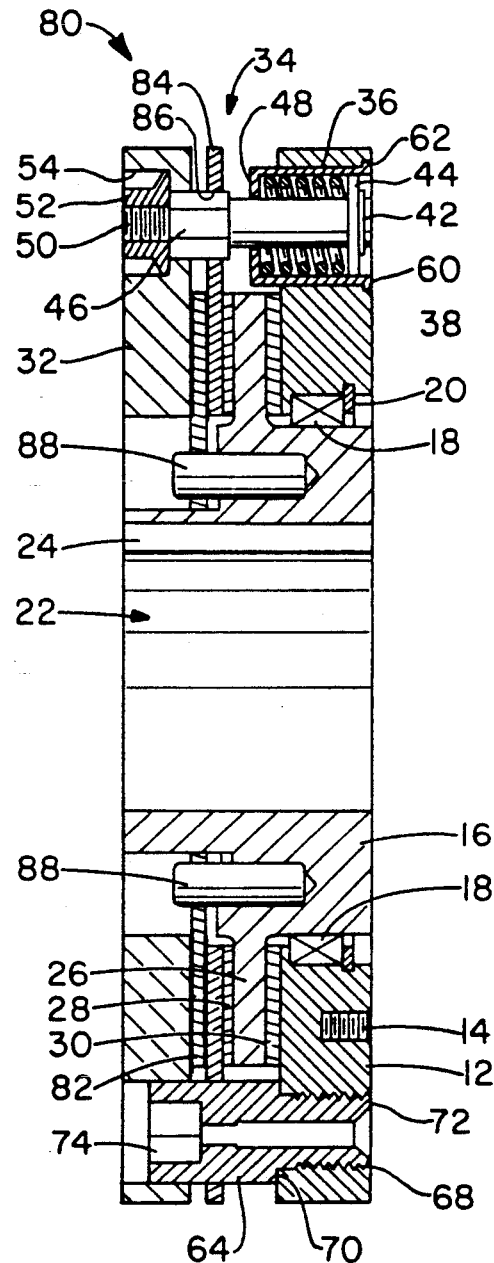
FIG. 2 is a cross sectional view of a compact torque limiting clutch according to a second embodiment of the invention.

Another embodiment of the invention is shown in FIG. 2, wherein a torque limiting clutch is designated generally by the numeral 80. In this embodiment, those elements corresponding to the elements of the torque limiting clutch 10 of FIG. 1 are designated by like numerals. Accordingly, it will be seen that an input flange 12 is received upon an output hub 16 through a bearing 18. As in FIG. 1, a pressure plate 32 and the input flange 12 are urged toward each other by spring cup assemblies 34. In this embodiment, however, to increase the characteristic break-away torque of the clutch 80, a friction disc 82, having a friction material on each side thereof, is interposed between the pressure plate 32 and the retainer plate 84. In this embodiment, the retainer plate 84 also operates as a separator plate between the friction disc 82 and the friction surface 28 of the flange 26. As in the clutch assembly of FIG. 1, the retainer plate 84 has openings 86 therein which are of similar geometry to the non-circular cross sectional geometry of the shoulder 46 of the bolt 40. Accordingly, the bolts 40 are prevented from rotating by the mating engagement of the openings 86 with the respective shoulders 46 during the assembly process.

It will also be noted that the assembly 80 of FIG. 2 also includes pins 88 passing through the friction disc 82 and into the output hub 16 to prevent rotational movement of the friction disc 82 independent of the output hub 16, while allowing axial movement. Of course, splines or keys could also be employed for such purposes.

It should now be appreciated that the torque limiting clutch 80 of FIG. 2 provides forceful frictional engagement at the interface of the friction disc 82 with the pressure plate 32, at the interface of the friction disc 82 with the retainer plate/separator plate 84, at the interface of the retainer plate/separator plate 84 and the friction surface 28, and at the interface of the friction surface 30 with the input flange 12. The characteristic break away torque is, accordingly, a function of these frictional interfaces and the number and character of spring cup assemblies 34 employed.

It will be appreciated by those skilled in the art that the assembly and operation of the torque limiting clutch 80 is, in most respects, similar to that of the clutch 10, described above. Again, the clutch 80 is of a "pancake" design, contained between the axially displaced external planar surfaces of the input flange 12 and the pressure plate 32. Additionally, during the assembly and disassembly of the clutches 10, 80 there is no need for access of any tools or the like internally of the clutch assembly. The bolts 40 are restricted from rotating by means of the respective retainer plates 56, 84.

It is further contemplated that the torque limiting clutches of the invention may be modified from the specific embodiments disclosed. The invention anticipates that the retainer plates 56, 84 may, if desired, be mounted external to the pressure plate 32, in which case the nuts 52 would tighten against the retainer plates. Additionally, the retainer plates 56, 84 may be eliminated or made integral with the pressure plate 32. It is contemplated that the bores of the pressure plate which receive the shoulders 46 of the bolt 40 may have a geometry substantially congruent with that of the cross sectional geometry of the shoulder 46 to provide mating engagement therebetween. Such would obviate the need of the retainer plates 56, 84 to restrict rotational movement while allowing axial movement of the bolt 40 during assembly.

Figure 3:
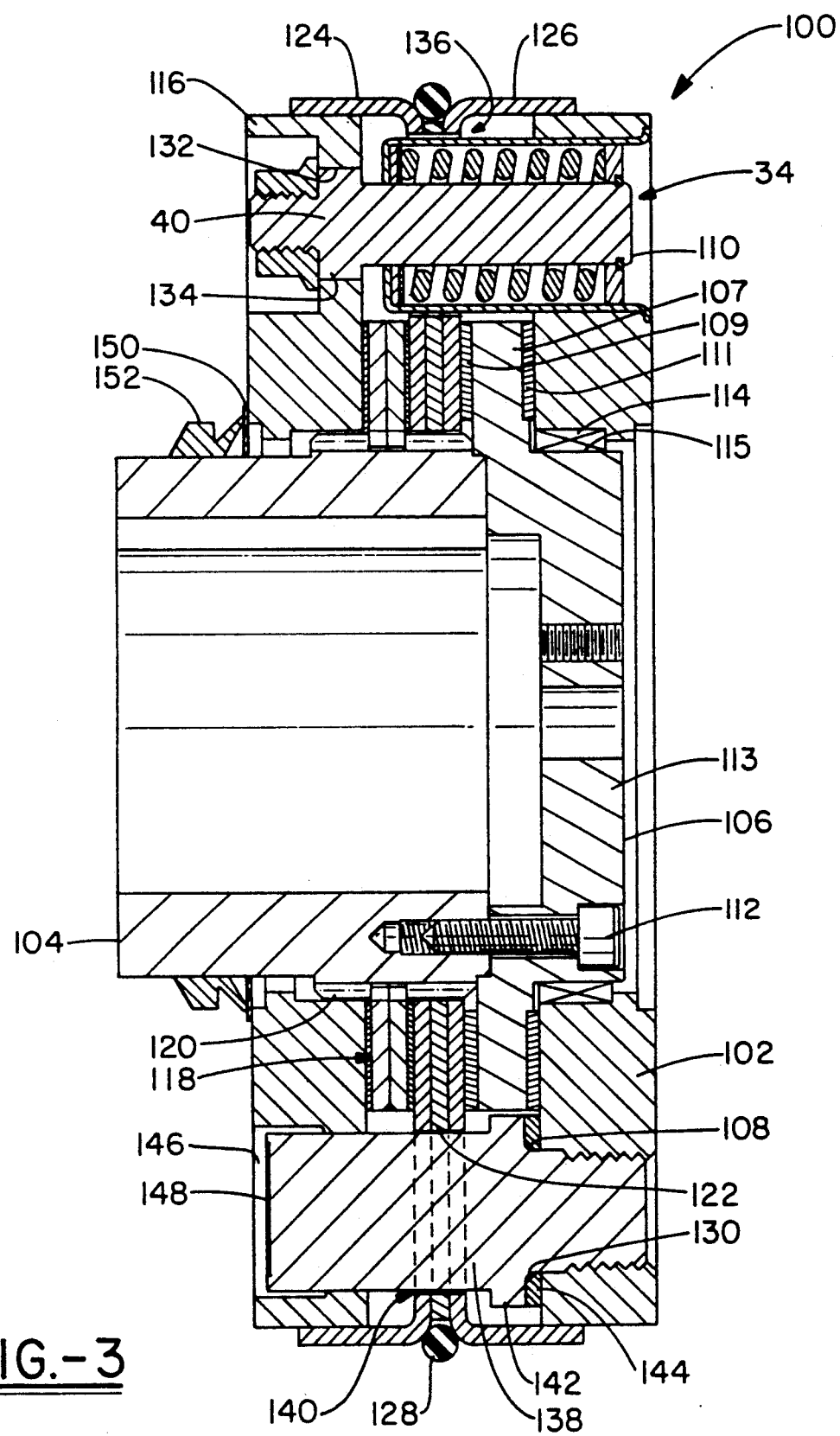
FIG. 3 is a cross sectional view of a compact torque limiting clutch according to a third embodiment of the invention.

Yet another embodiment of the invention is shown in FIG. 3 wherein a torque limiting clutch is designated generally by the numeral 100. Here, an input flange 102, comprising an annular plate, is provided to receive a power input source such as a coupling, sprocket, pulley or the like. An output hub 104 is also provided to appropriately receive a shaft or the like to be driven. A friction disc 106 is fixed to the output hub 104 by means of bolts 112. The disc 106 includes an annular shoulder flange 107 having friction material 109, 111 bonded to opposite sides thereof. An end cup or keeper plate 113 of the disc 106 is provided with an outer circumferential race surface 115. A bearing 114 is interposed between the input flange 102 and the race 115 to maintain concentricity between the input flange 102 and output hub 104 while accommodating rotational movement of the input flange 102 upon the friction disc 106 when the torque applied to the clutch 110 exceeds a break-away level.

An annular pressure plate 116 is received over the output hub 104. A second friction disc 118 is splined to the output hub 104 as at 120 to allow for axial movement of the disc 118 upon the hub 104. As shown, the friction disc 118 may consist of two discs held back-to-back, or could comprise a single disc, but in either event with friction material provided on opposite surfaces thereof. A separator plate 122 may be interposed between the splined friction disc 118 and the fixed friction disc 106. Those skilled in the art will appreciate that the pressure plate 116 urges the friction discs 106, 118 into frictional engagement with the separator plate 122 as well as the drive flange 102 and the pressure plate itself.

As shown, the separator plate 122 may be provided to extend the full diameter of the torque limiting clutch 100 and is preferably provided with a pair of shields or covers 124, 126 positioned adjacent opposite planar surfaces thereof. It is also contemplated that the separator plate 122 may be eliminated, with the shields 124, 126 serving the function thereof. The shields 124, 126 are, as shown, generally cup-shaped, having outwardly extending flanges or side edges which respectively extend over the pressure plate 116 and the drive or input flange 102. The extensions of these cup-shaped covers shield the interior of the clutch assembly 100 from the environment, preventing the entry of contaminants or foreign particles which might adversely impact the operability of the device. When used in a corrosive environment, it is preferred that the shields 124, 126 be of corrosion resistant construction. For purposes of heat dissipation, it is preferred that the optional separator plate 122 be of copper construction or other material of high thermal conductivity. It will be appreciated that the extension of the shields 124, 126 to the exterior of the clutch 100 assists in dissipating heat generated from the frictional slippage.

The utilization of the shields 124, 126 to protect against contamination is further assisted by the utilization of an "O" ring 128 which extends about the circumferential edge of the separator plate 122 at the point of departure of the shields 124, 126 therefrom. In the preferred embodiment of the invention, the unextended diameter of the "O" ring 128 is slightly less than the diameter thereof when positioned to seal the interface between the shields 124, 126 and the separator plate 122 as shown. Accordingly, the "O" ring is elastically held in place in contact with the circumferential edges of the covers 124, 126.

As shown in FIG. 3, spring cup bolt assemblies 34 similar to those presented in the embodiments of FIGS. 1 and 2 are interposed between the input flange 102 and the pressure plate 116 to urge the two together against the friction discs 106, 118 and separator plate 122. As illustrated, the spring cup bolt assemblies 34 are received within and between the exposed exterior surfaces of the pressure plate 116 and input drive flange 102. In the preferred embodiment of the invention, hexagonal holes 132 are provided within the pressure plate 116 for receiving the corresponding hexagonal shoulder 134 of the bolts of associated spring cup assemblies 34. Such locking interengagement prevents any turning of the bolt of the assembly 34 during assembly. It will also be appreciated that holes 136 are provided through the separator plate 122 and shields 124, 126 near the outer edges thereof to receive the spring cup bolt assemblies 34 as shown. This configuration allows the separator plate 122 to extend substantially the full diameter of the clutch 10, achieving the desired heat dissipation.

Torque pins 138 are also provided about the periphery of the clutch 10, being threadedly engaged to the drive flange 102 as shown. Torque pins 138 pass through holes 140 in the separator plate 122 and shields 124, 126 to rotationally secure the separator plate 122 and shields 124, 126 to the drive flange 102 and pressure plate 116. The torque pins 138 are each provided with a hexagonal shoulder 142 for receiving a wrench or the like during assembly to facilitate the threaded engagement with the drive flange 102. The hex shoulder 142 is positioned to mate with a chamfered washer 144 to maximize clamping area and torque pin strength. For this purpose, the chamfer 130 of the washer 144 accommodates a radius 108 beneath the shoulder 142 of the torque pin 138.

As an important feature of the invention, the torque pin 138 is recessed within a bore passing through the pressure plate 116. When the clutch 100 is first assembled, the depth of the recess 146 is equivalent to the aggregate allowable wear of the friction surfaces of the discs 106, 118. Accordingly, when the label 148 on the end of the torque pin 138 is flush with the external surface of the pressure plate 116, it is an indication that the friction surfaces of the friction discs 106, 118 have been spent and that the clutch 100 must be rebuilt. In the preferred embodiment of the invention, the label 148 bears a message such as "Rebuild When Pin Protrudes" or the like. Similarly, the ends 110 of the bolts 40 may be color coded or otherwise marked to indicate characteristic spring cup bolt force.

As a further part of the invention, a seal ring 150 is received upon and about the output hub 104 in sealing contacting engagement with the pressure plate 116, as shown. A V-ring seal 152 is similarly received upon the output hub 104 and in engagement with the seal ring 150 to maintain it in sealing interengagement between the hub 104 and pressure plate 116, accommodating any axial movement of the pressure plate 116 resulting from wear. In the preferred embodiment of the invention, the seal ring 150 is of plastic or other suitable material.

It will be appreciated that the interengagement of the fixed friction disc 106 and axially moveable friction disc 118 with the separator plate 122 and the inner surfaces of the pressure plate 116 and drive flange 102 establishes a characteristic break-away torque for the clutch 100. This torque is a function of the strength and number of spring cup bolt assemblies 34 urging the pressure plate 134 toward the input flange 102. When the break-away torque is exceeded, the drive flange 102, separator plate 122, and pressure plate 116 rotate with respect to the output hub 104, keeper plate 108, and friction discs 106, 118. The bearing 114 accommodates the relative rotation between the input drive flange 102 and keeper plate 108, while the bolts 112 assure that axial alignment of the elements of the clutch 100 is maintained.

Thus it can be seen that the objects of the invention have been satisfied by the structure presented above. While in accordance with the patent statutes only the best mode and preferred embodiments of the invention have been presented and described in detail, it is to be understood that the invention is not limited thereto or thereby. Accordingly, for an appreciation of the true scope and breadth of the invention, reference should be made to the following claims.

What is claimed is:

1. A torque limiting clutch, comprising:
   an input flange;
   an output hub;
   a pressure plate received upon said output hub;
   a first friction disc interposed between said pressure plate and said input flange;
   a keeper plate received by said hub, said keeper plate fixedly securing said first friction disc to said output hub; and
   spring biasing means interposed between said input flange and said pressure plate for urging said pressure plate toward said input flange, said spring biasing means comprising a bolt having a collar of a selected geometric configuration, said pressure plate having a hole therein of said selected geometric configuration, said collar being received and retained from a rotation by said hole.

2. The torque limiting clutch according to claim 1, wherein said keeper plate is attached to an end of said hub and clamps said first friction disc to said hub, said keeper plate being axially aligned upon said hub.

3. The torque limiting clutch according to claim 1, wherein said input flange is received upon said keeper plate, and further comprising a bearing interposed between said input flange and said keeper plate, said input flange, keeper plate, and bearing being coaxial.

4. The torque limiting clutch according to claim 3, wherein said first friction disc and said keeper plate are of integral construction.

5. The torque limiting clutch according to claim 1, wherein said bolt is color coded as an indication of a characteristic force of said spring biasing means.

6. The torque limiting clutch according to claim 1, further comprising a second friction disc splined to and axially movable upon said output hub, said pressure plate urging said second friction disc toward said separator disc, said separator disc being interposed between said first and second friction discs.

7. The torque limiting clutch according to claim 1, further comprising an annular seal about said output hub and in sealing engagement with said pressure plate.

8. The torque limiting clutch according to claim 1, further comprising a separator disc interposed between said first friction disc and said pressure plate, said spring means passing through said separator disc.

9. A torque limiting clutch, comprising:
an input flange;
an output hub;
a pressure plate received upon said output hub;
a first friction disc interposed between said pressure plate and said input flange;
a keeper plate received by said hub, said keeper plate fixedly securing said first friction disc to said output hub;
spring biasing means interposed between said input flange and said pressure plate for urging said pressure plate toward said input flange; and
first and second cup-shaped annular shields positioned adjacent each other and between said pressure plate and first friction disc, said first cup-shaped annular shield having side edges extending over said input flange and said second cup-shaped annular shield having side edges extending over said pressure plate.

10. The torque limiting clutch according to claim 9, further comprising a seal interposed between said first and second cup-shaped annular shields between said side edges thereof.

11. A torque limiting clutch, comprising:
an input flange;
an output hub;
a pressure plate received upon said output hub;
a first friction disc interposed between said pressure plate and said input hub;
a keeper plate received by said output hub, said keeper plate fixedly securing said first friction disc to said output hub;
spring biasing means interposed between said input flange and said pressure plate for urging said pressure plate toward said input flange;
a separator disc interposed between said first friction disc and said pressure plate, said spring means passing through said separator disc; and
a first shield on a first side of said separator disc and extending to a periphery thereof, said first shield being cup-shaped with side edges extend over one of said input flange and pressure plate.

12. The torque limiting clutch according to claim 11, wherein said separator disc has a second shield positioned on a second side thereof and extending to said periphery of said separator disc, said second shield being cup-shaped with side edges extending over the other of said input flange and pressure plate.

13. The torque limiting clutch according to claim 12, wherein said first and second shields dissipate heat from said separator disc to the ambient of said torque limiting clutch.

14. The torque limiting clutch according to claim 12, further comprising a seal interposed between said shields and said periphery of said separator disc.

15. A torque limiting clutch, comprising:
an input flange;
an output hub;
a pressure plate received upon said output hub;
a first friction disc interposed between said pressure plate and said input flange;
a keeper plate received by said hub, said keeper plate fixedly securing said first friction disc to said output hub; and
a torque pin passing through said pressure plate and threadedly received by said input flange, a chamfered washer being interposed between a shoulder of said torque pin and said input flange.

16. The torque limiting clutch according to claim 15, wherein said torque pin has an arcuate surface between said shoulder and an axial body of said torque pin, said chamfered washer having a chamfered surface in juxtaposition to said arcuate surface.

17. The torque limiting clutch according to claim 15, wherein said torque pin is recessed within said pressure plate until said first friction disc is spent.

18. The torque limiting clutch according to claim 17, wherein said torque pin passes through said separator disc.

* * * * *